US010820193B2

(12) United States Patent
Nakarmi et al.

(10) Patent No.: US 10,820,193 B2
(45) Date of Patent: Oct. 27, 2020

(54) NETWORK NODE FOR USE IN A COMMUNICATION NETWORK, A COMMUNICATION DEVICE AND METHODS OF OPERATING THE SAME

(71) Applicant: Telefonaktiebolaget LM Ericsson (publ), Stockholm (SE)

(72) Inventors: Prajwol Kumar Nakarmi, Sollentuna (SE); Noamen Ben Henda, Stockholm (SE); Gunnar Mildh, Sollentuna (SE); Monica Wifvesson, Lund (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 16/380,683

(22) Filed: Apr. 10, 2019

(65) Prior Publication Data
US 2019/0239130 A1 Aug. 1, 2019

Related U.S. Application Data

(63) Continuation of application No. 15/752,443, filed as application No. PCT/EP2017/084399 on Dec. 22, 2017.
(Continued)

(51) Int. Cl.
*H04W 12/00* (2009.01)
*H04W 36/00* (2009.01)
(Continued)

(52) U.S. Cl.
CPC ........ *H04W 12/0013* (2019.01); *H04L 63/06* (2013.01); *H04W 12/0401* (2019.01);
(Continued)

(58) Field of Classification Search
CPC ......... H04W 36/0016; H04W 36/0038; H04W 76/19; H04W 76/27; H04W 12/0013;
(Continued)

(56) References Cited

U.S. PATENT DOCUMENTS

2004/0242228 A1* 12/2004 Lee ..................... H04L 63/062
455/432.1
2005/0282548 A1* 12/2005 Kim .................. H04W 36/0055
455/436
(Continued)

FOREIGN PATENT DOCUMENTS

WO    2015/113197 A1    8/2015

OTHER PUBLICATIONS

Unknown, 3GPP TS 36.331 version 9.16.0 Release 9, 2013-9, ETSI,TS 136 331 V9.16.0 (Sep. 2013), pp. 1-264 (Year: 2013).*
(Continued)

*Primary Examiner* — Jung W Kim
*Assistant Examiner* — Adrian Stoica
(74) *Attorney, Agent, or Firm* — Rothwell, Figg, Ernst & Manbeck, P.C.

(57) ABSTRACT

Network node for use in a communication network, a communication device and methods of operating the same. According to an exemplary aspect, there is provided a method of operating a communication device, the method comprising receiving an indication of whether a first key that is used for encrypting communications on a first radio link with a communication network is to be reused for encrypting communications on a second radio link with the communication network; and if the received indication indicates that the first key is to be reused, determining whether to operate according to the received indication and reuse the first key for encrypting communications on the second radio link.

20 Claims, 8 Drawing Sheets

Related U.S. Application Data

(60) Provisional application No. 62/472,675, filed on Mar. 17, 2017.

(51) Int. Cl.
  *H04W 76/19* (2018.01)
  *H04L 29/06* (2006.01)
  *H04W 12/04* (2009.01)
  *H04W 76/27* (2018.01)

(52) U.S. Cl.
  CPC ........... *H04W 12/04031* (2019.01); *H04W 12/04033* (2019.01); *H04W 36/0016* (2013.01); *H04W 36/0038* (2013.01); *H04W 76/19* (2018.02); *H04W 76/27* (2018.02)

(58) Field of Classification Search
  CPC ........... H04W 12/04; H04W 12/0403; H04W 12/04031; H04W 12/04033; H04W 12/0401; H04L 63/06; H04L 63/061; H04L 63/068
  See application file for complete search history.

(56) References Cited

U.S. PATENT DOCUMENTS

| | | | |
|---|---|---|---|
| 2009/0220087 A1* | 9/2009 | Brusilovsky | H04L 63/062 380/272 |
| 2009/0296658 A1 | 12/2009 | Calhoun et al. | |
| 2010/0002883 A1* | 1/2010 | Sammour | H04L 63/1416 380/272 |
| 2012/0008776 A1 | 1/2012 | Ishida et al. | |
| 2012/0216039 A1 | 8/2012 | Franklin et al. | |
| 2012/0276913 A1 | 11/2012 | Lim et al. | |
| 2015/0038145 A1* | 2/2015 | Nakata | H04W 36/0055 455/436 |
| 2015/0126154 A1* | 5/2015 | Yang | H04W 12/04 455/411 |
| 2017/0111842 A1* | 4/2017 | Manroa | H04W 8/18 |
| 2019/0014509 A1 | 1/2019 | Nakarmi et al. | |

OTHER PUBLICATIONS

International Search Report and Written Opinion issued in International Application No. PCT/EP2017/084399, dated Apr. 10, 2018, 21 pages.

Samsung, "Discussion on alternatives for Key Handling during Active mode mobility", 3GPP Draft; 3GPP TSG SA WG3 Security—SA3#49, S3-070800, Munich, Germany, Oct. 8-12, 2007, 4 pages.

Non-Final Office Action issued in U.S. Appl. No. 15/752,443 dated Aug. 21, 2019, (35 pages).

Indian Office action and English Translation, issued in corresponding Indian Patent Application No. 201817005057 dated Mar. 16, 2020, 6 pages.

* cited by examiner

NETWORK NODE FOR USE IN A COMMUNICATION NETWORK, A COMMUNICATION DEVICE AND METHODS OF OPERATING THE SAME

CROSS-REFERENCE TO RELATED APPLICATIONS

This Application is a continuation of U.S. application Ser. No. 15/752,443, having a § 371(c) date of Feb. 13, 2018, which is a 35 U.S.C. § 371 National Stage of International Patent Application No. PCT/EP2017/084399, filed Dec. 22, 2017, designating the United States and claiming priority to U.S. provisional application No. 62/472,675, filed on Mar. 17, 2017. The above identified applications are incorporated by reference

TECHNICAL FIELD

This application relates to a communication device and a communication network, and in particular to the use of a key in the communication network.

BACKGROUND

In Long Term Evolution (LTE) communication networks, the communications between the user equipment (UE) and an eNB are encrypted and partially integrity protected. The integrity and encryption keys are derived from a common root key called the $K_{eNB}$ which is shared between the UE and the eNB. The $K_{eNB}$ is unique to the UE-PCell pair, where PCell is the primary cell that the UE uses as a 'master' cell when communicating with an eNB. Since the UE only uses one PCell for communicating with an eNB, the $K_{eNB}$ is also unique for the UE-eNB pair. That is, the same $K_{eNB}$ is never used to protect the traffic between the UE and two different eNBs. The rationale behind this design is to prevent an attacker that has gained access to or knowledge of a $K_{eNB}$ that is used between a UE and a first eNB to have any use for that $K_{eNB}$ when attempting to break encryption or integrity on traffic between the UE and a different eNB.

To ensure that the $K_{eNB}$ is unique per UE-eNB pair, $K_{eNB}$ is changed during handover between two eNBs. For simplicity, $K_{eNB}$ is actually changed on all intra-LTE handovers (e.g. handover between cells), even when the source eNB and target eNB is the same node.

The uniqueness of the UE-$K_{eNB}$ pair during handover is achieved by the fact that the UE and source eNB derive a new $K_{eNB}$ (denoted $K_{eNB}*$) from the current $K_{eNB}$, the Physical Cell Identifier (PCI) of the target primary cell (PCell) and the target physical cell downlink frequency (e.g. the Evolved Absolute Radio Frequency Channel Number for the downlink, EARFCN-DL). This is specified in clause 7.2.8 of 3GPP TS 33.401 "3GPP System Architecture Evolution (SAE); Security architecture", version 12.14.0 (2015-03).

More specifically, the input to the key derivation function (KDF) to derive $K_{eNB}*$ is: FC=0x13; P0=PCI (target PCI); L0=length of PCI (i.e. 0x00 0x02); P1=EARFCN-DL (target physical cell downlink frequency); L1 length of EARFCN-DL (i.e. 0x00 0x02).

A handover between two eNBs without core network involvement, a so-called X2 handover, is described below with reference to FIG. 1. Handovers can be performed after the UE has completed all necessary procedures to activate Radio Resource Control (RRC) and Non-Access Stratum (NAS) security. The X2 handover is initiated by the source eNB (or a source cell) 1 calculating a $K_{eNB}*$ key from the currently active $K_{eNB}$, shared between the source eNB 1 and the UE 2, and sending it together with the UE security capabilities to the target eNB (or a target cell) 3 in a handover request message 4. The target eNB/cell 3 replies with the required configuration information 5 for the UE connection. This information includes the chosen algorithms that the target eNB/cell 3 and the UE 2 shall use. The source eNB/cell 1 then forwards the reply to the UE 2 (signal 6), and the UE 2 confirms the handover with a completion message 7 to the target eNB/cell 3. In the last step, the target eNB/cell 3 retrieves a new key called the Next Hop key (NH) from a Mobility Management Entity (MME). The NH is derived from a key $K_{ASME}$ (a base key that is shared by the UE and MME) and the NH is used as a basis for the calculation of $K_{eNB}*$ in the next handover event.

In some scenarios the source eNB/cell doesn't have a "fresh" NH key when performing a handover, and instead the eNB can create a new $K_{eNB}*$ from the current $K_{eNB}$. This is called a vertical key derivation. An NH key is referred to as being "fresh" when it has not previously been used.

The $K_{eNB}*$ key itself is not sent from the eNB to the UE, and instead an information element (IE) indicating whether the $K_{eNB}*$ is derived vertically (i.e. a fresh NH exists) or horizontally (no new NH exists in the eNB) is sent to the UE. This is information element is called NCC (Next-hop Chaining Counter) and is included in the RRC reconfiguration message. The NCC is a value between 0-7. If the NCC is stepped, then the UE knows that a vertical key derivation shall be performed, and when the NCC is the same as the NCC associated with the currently active $K_{eNB}$, the UE will instead perform a horizontal key derivation.

A trend in today's networks is for the operator to add more frequencies and reduce the size of cells to increase the capacity of mobile broadband. This leads to an increase in UE reconfigurations and mobility actions.

The ability to quickly move or resume a UE session between cells becomes increasingly more important in order to fit the traffic patterns associated with short data bursts. However, since the encryption and integrity keys are derived from a base key ($K_{eNB}$) that is tied to the primary cell (via the use of the EARFCN-DL of the primary cell and the PCI in the derivation of the key $K_{eNB}$), each time the UE moves from that PCell or reconnects in another PCell a key renegotiation must be performed before traffic can resume. This causes a problem since re-negotiation of the $K_{eNB}$ consumes considerable processor cycles and memory, and in particular results in the encryption and integrity keys having to be derived from the new $K_{eNB}$. When the encryption key is updated, some already encrypted packets must be buffered, decrypted using the old encryption key and then re-encrypted using the new encryption key. An analogous problem is that already integrity protected packets similarly need to be re-protected using the new integrity protection key. This adds delay that reduces the end-user experience. Moreover, it complicates the implementation of the eNB, leading to increased risk for implementation errors and increased cost for code maintenance.

The problem above is specific to the way security is handled in LTE, although the problem may also be evident in other types of communication networks. It will be appreciated that the need to optimise security processing is common to many different types of network.

SUMMARY

Thus, as noted above, in conventional LTE systems, one of the consequences of the handover procedure is that the security keys used for the protection of the radio interface communication (which are also referred to as access stratum (AS) keys) are always changed. In other words, the AS keys specific to the UE are always changed as the result of the handover procedure.

In regard to the future $5^{th}$ Generation (5G) systems, it is being discussed that the change of AS keys due to handover may negatively impact the system efficiency and therefore there should be a mechanism to retain the AS keys whenever it is acceptable to do so from a security perspective. In view of this, it may be possible to provide mechanisms to retain the AS keys even after the handover. In some possible mechanisms, the network can instruct a UE whether a key (the AS key/$K_{eNB}$) is to be retained or changed and the UE is required to follow the network's instruction.

The possibility for the network to instruct the UE to retain the AS keys opens up a risk of the network never changing the UE's AS keys, even though the UE has undergone multiple handovers, no matter whether they are intra-eNB or inter-eNB (in terms of LTE).

There could be a variety of reasons that the network does not ever change the UE's AS keys, e.g., a faulty implementation of the standards in the network, a simplified implementation, poor configuration, a compromised configuration, a deliberate choice by a network operator to compromise security to gain efficiency, etc. The consequence of the AS key not being changed is that the security of UE's communication is put at risk.

More precisely, retaining the AS key for a long time, across multiple handovers, incurs the following risks. First, even the key is not used, sharing it with several target nodes represents an unnecessary disclosure of security information. As the radio access network (RAN) domain is usually considered less secure than the core network (CN) domain due to the potential physical exposure of the radio equipment, this implies a higher risk for a key compromise. Second, using the same key for a long time does not improve matters even in the case that encryption is enabled. The threat model for the radio interface assumes that all traffic is available to the attacker, and therefore an attacker would be able collect a large volume of data that is protected by the same key. Although this might not currently be computationally feasible, it still improves the chances of the attacker recovering the key.

Additionally, there could be scenarios where different operators have different levels of security awareness or concerns. Given that the subscribers (UEs) can roam into other operators' networks, it is not sufficient for the security aware operator to be concerned about changing keys in its own network, when that security aware operator's subscribers can move into other networks which have more relaxed security requirements.

Therefore, there is a need for improved techniques for addressing one or more of the above concerns, and in particular it is an objective to provide improved techniques that can enable the reuse of security keys without significantly impacting the security of communications between a communication device and the network.

According to a first aspect, there is provided a method of operating a communication device, the method comprising receiving an indication of whether a first key that is used for encrypting communications on a first radio link with a communication network is to be reused for encrypting communications on a second radio link with the communication network; and if the received indication indicates that the first key is to be reused, determining whether to operate according to the received indication and reuse the first key for encrypting communications on the second radio link. Thus, this aspect provides that the communication device is able to decide for itself (e.g. based on a policy, based on how much the key has already been reused, etc.) whether or not a key is to be reused for communications on another radio link.

According to a second aspect, there is provided a method of operating a communication device, the method comprising receiving an indication of whether a first key that is used for encrypting communications on a first radio link is to be reused for encrypting communications on a second radio link; and sending a message to a network node, the message containing information on the received indication. This aspect provides that a communication device can convey information about whether or not the communication device has been informed that a key can be reused for another radio link to a network node, for example in the home network of the communication device. The network can use this information for a variety of purposes, for example to check that nodes in the network are operating correctly, to check that roaming partners are operating according to a roaming agreement, to determine whether the communication device can reuse the key, etc.

According to a third aspect, there is provided a method of operating a network node in a communication network, the method comprising receiving an indication regarding a communication device, the indication indicating whether a first key that is used for encrypting communications for the communication device on a first radio link can be reused for encrypting communications for the communication device on a second radio link; and performing an action in response to the received indication. This aspect provides that a network node can receive information about whether or not a communication device has been informed that a key can be reused for another radio link. The network node can use this information for a variety of purposes, for example to check that nodes in the network are operating correctly, to check that roaming partners are operating according to a roaming agreement, to determine whether the communication device can reuse the key, etc.

According to a fourth aspect, there is provided a computer program product comprising a computer readable medium having computer readable code embodied therein, the computer readable code being configured such that, on execution by a suitable computer or processor, the computer or processor is caused to perform any of the methods described above.

According to a fifth aspect, there is provided a communication device, the communication device being configured to receive an indication of whether a first key that is used for encrypting communications on a first radio link with a communication network is to be reused for encrypting communications on a second radio link with the communication network; and determine whether to operate according to the received indication and reuse the first key for encrypting communications on the second radio link if the received indication indicates that the first key is to be reused. Thus, this aspect provides that the communication device is able to decide for itself (e.g. based on a policy, based on how much the key has already been reused, etc.) whether or not a key is to be reused for communications on another radio link.

According to a sixth aspect, there is provided a communication device, the communication device being configured to receive an indication of whether a first key that is used for encrypting communications on a first radio link is to be reused for encrypting communications on a second radio link; and send a message to a network node in a home network of the communication device, the message containing information on the received indication. This aspect provides that a communication device can convey information about whether or not the communication device has been informed that a key can be reused for another radio link to a network node, for example in the home network of the communication device. The network can use this information for a variety of purposes, for example to check that nodes in the network are operating correctly, to check that roaming partners are operating according to a roaming agreement, to determine whether the communication device can reuse the key, etc.

According to a seventh aspect, there is provided a network node for use in a communication network, the network node being configured to receive an indication regarding a communication device, the indication indicating whether a first key that is used for encrypting communications for the communication device on a first radio link can be reused for encrypting communications for the communication device on a second radio link; and perform an action in response to the received indication. This aspect provides that a network node can receive information about whether or not a communication device has been informed that a key can be reused for another radio link. The network node can use this information for a variety of purposes, for example to check that nodes in the network are operating correctly, to check that roaming partners are operating according to a roaming agreement, to determine whether the communication device can reuse the key, etc.

According to an eighth aspect, there is provided a communication device, the communication device comprises a processor and a memory, said memory containing instructions executable by said processor whereby said communication device is operative to receive an indication of whether a first key that is used for encrypting communications on a first radio link with a communication network is to be reused for encrypting communications on a second radio link with the communication network; and determine whether or not to operate according to the received indication and reuse the first key for encrypting communications on the second radio link if the received indication indicates that the first key is to be reused.

According to a ninth aspect, there is provided a communication device, the communication device comprises a processor and a memory, said memory containing instructions executable by said processor whereby said communication device is operative to receive an indication of whether a first key that is used for encrypting communications on a first radio link is to be reused for encrypting communications on a second radio link; and send a message to a network node in a home network of the communication device, the message containing information on the received indication.

According to a tenth aspect, there is provided a network node for use in a communication network, the network node comprises a processor and a memory, said memory containing instructions executable by said processor whereby said network node is operative to receive an indication regarding a communication device, the indication indicating whether a first key that is used for encrypting communications for the communication device on a first radio link can be reused for encrypting communications for the communication device on a second radio link; and perform an action in response to the received indication.

According to an eleventh aspect, there is provided a communication device, the communication device comprising a receiving module for receiving an indication of whether a first key that is used for encrypting communications on a first radio link with a communication network is to be reused for encrypting communications on a second radio link with the communication network; and a determining module for determining whether or not to operate according to the received indication and reuse the first key for encrypting communications on the second radio link if the received indication indicates that the first key is to be reused.

According to a twelfth aspect, there is provided a communication device, the communication device comprising a receiving module for receiving an indication of whether a first key that is used for encrypting communications on a first radio link is to be reused for encrypting communications on a second radio link; and a sending module for sending a message to a network node, the message containing information on the received indication.

According to a thirteenth aspect, there is provided a network node for use in a communication network, the network node comprising a receiving module for receiving an indication regarding a communication device, the indication indicating whether a first key that is used for encrypting communications for the communication device on a first radio link can be reused for encrypting communications for the communication device on a second radio link; and a performing module for performing an action in response to the received indication.

BRIEF DESCRIPTION OF THE DRAWINGS

Exemplary embodiments of the techniques introduced in this document are described below with reference to the following figures, in which.

DETAILED DESCRIPTION

Figure 1:
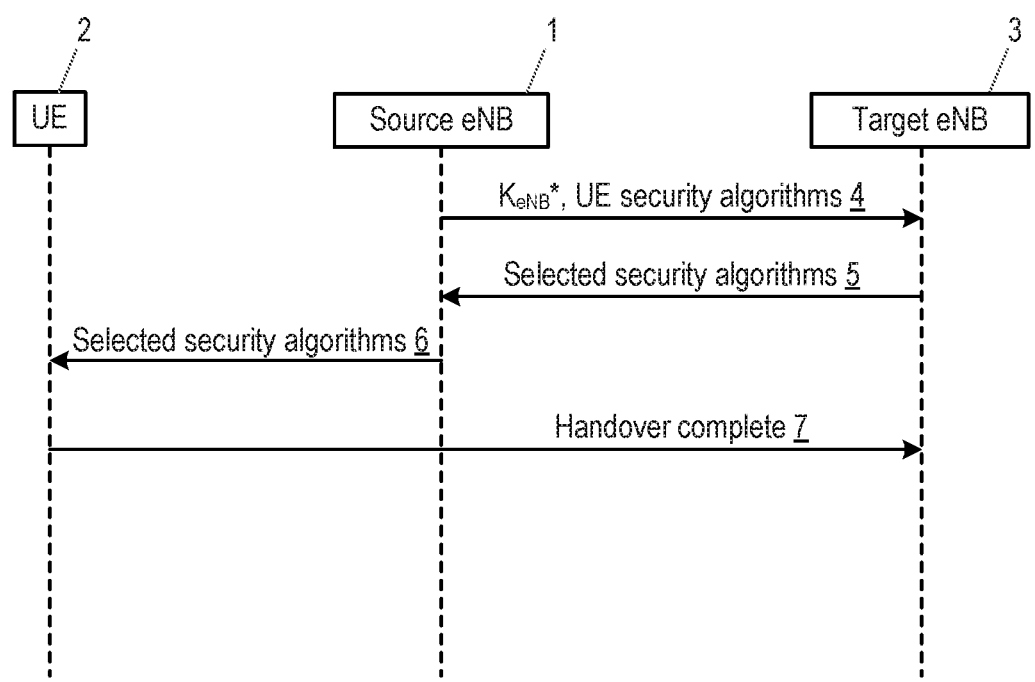
FIG. 1 illustrates the signalling in a handover between a source eNB and a target eNB in an LTE network.

The following sets forth specific details, such as particular embodiments for purposes of explanation and not limitation.

But it will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing units, one or more processing modules or one or more controllers, and the terms computer, processor, processing unit, processing module and controller may be employed interchangeably. When provided by a computer, processor, processing unit, processing module or controller, the functions may be provided by a single dedicated computer, processor, processing unit, processing module or controller, by a single shared computer, processor, processing unit, processing module or controller, or by a plurality of individual computers, processors, processing units, processing modules or controllers, some of which may be shared or distributed. Moreover, these terms also refer to other hardware capable of performing such functions and/or executing software, such as the example hardware recited above.

Although in the description below the term user equipment (UE) is used, it should be understood by the skilled in the art that "UE" is a non-limiting term comprising any mobile device, communication device, wireless communication device, terminal device or node equipped with a radio interface allowing for at least one of: transmitting signals in uplink (UL) and receiving and/or measuring signals in downlink (DL). A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "UE", the general terms "terminal device", "communication device" and "wireless communication device" are used in the following description, and it will be appreciated that such a device may or may not be 'mobile' in the sense that it can be carried by a user. Instead, the term "communication device" (and the alternative general terms set out above) encompasses any device that is capable of communicating with communication networks that operate according to one or more mobile communication standards, such as the Global System for Mobile communications, GSM, Universal Mobile Telecommunications System (UMTS), Long-Term Evolution, LTE, any future 5G standard, etc.

One or more cells are associated with a base station, where a base station comprises in a general sense any network node transmitting radio signals in the downlink and/or receiving radio signals in the uplink. Some example base stations, or terms used for describing base stations, are eNodeB, eNB, NodeB, macro/micro/pico/femto radio base station, home eNodeB (also known as femto base station), relay, repeater, sensor, transmitting-only radio nodes or receiving-only radio nodes. A base station may operate or at least perform measurements in one or more frequencies, carrier frequencies or frequency bands and may be capable of carrier aggregation. It may also be a single-radio access technology (RAT), multi-RAT, or multi-standard node, e.g., using the same or different base band modules for different RATs.

Unless otherwise indicated herein, the signalling described is either via direct links or logical links (e.g. via higher layer protocols and/or via one or more network nodes).

Figure 2:
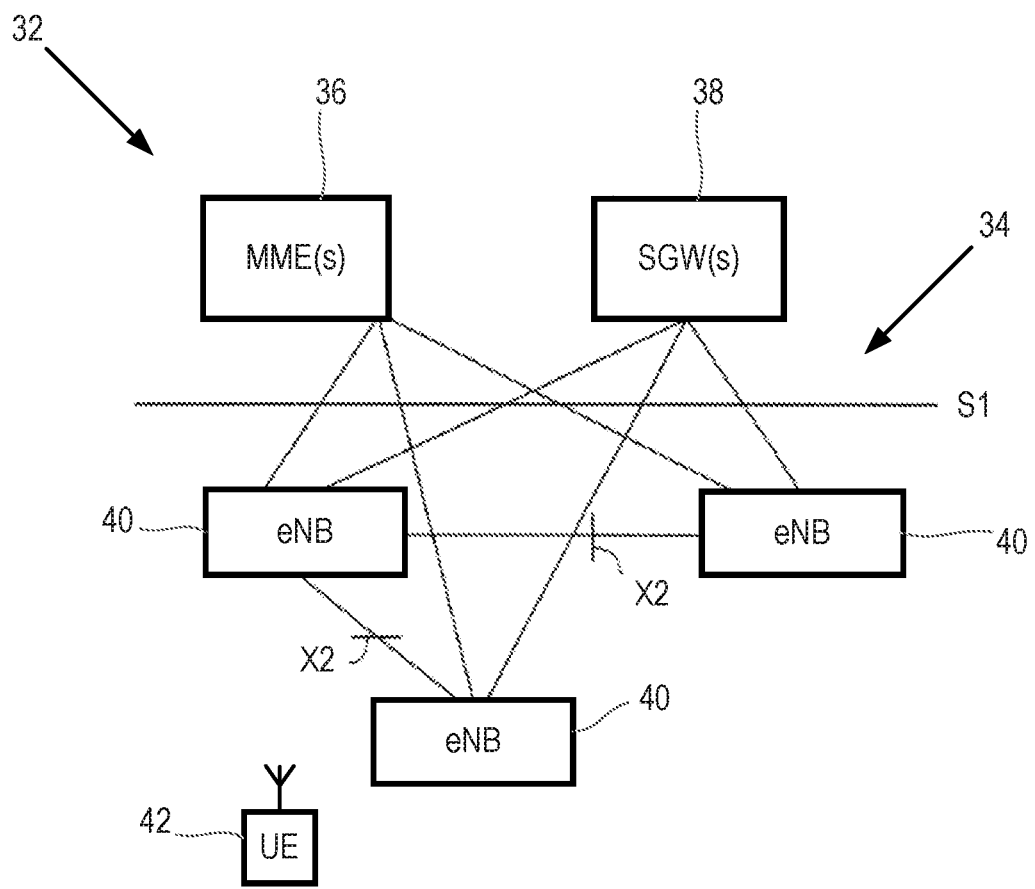
FIG. 2 is a non-limiting example block diagram of a LTE cellular communications network.

FIG. 2 shows an example diagram of an evolved Universal Mobile Telecommunications System (UMTS) Terrestrial Radio Access Network (E-UTRAN) architecture as part of an LTE-based communications system 32 to which the techniques described herein can be applied. Nodes in a core network 34 part of the system 32 include one or more Mobility Management Entities (MMEs) 36, a key control node for the LTE access network, and one or more Serving Gateways (SGWs) 38 which route and forward user data packets while acting as a mobility anchor. They communicate with base stations or radio access nodes 40 referred to in LTE as eNBs, over an interface, for example an S1 interface. The eNBs 40 can include the same or different categories of eNBs, e.g. macro eNBs, and/or micro/pico/femto eNBs. The eNBs 40 communicate with each other over an inter-node interface, for example an X2 interface. The S1 interface and X2 interface are defined in the LTE standard. A UE 42 is shown, and a UE 42 can receive downlink data from and send uplink data to one of the base stations 40, with that base station 40 being referred to as the serving base station of the UE 42.

Figure 3:
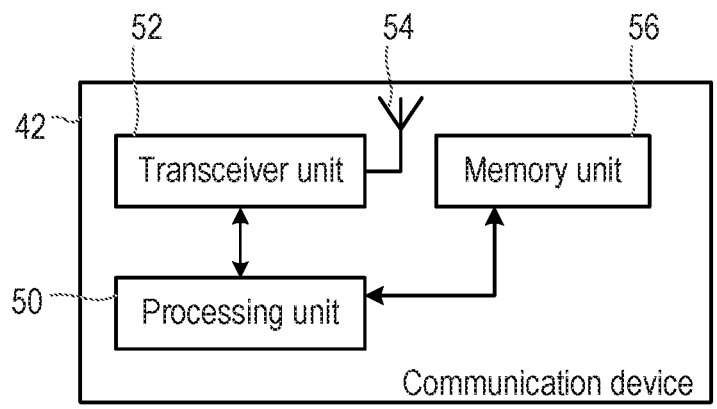
FIG. 3 is a block diagram of a communication device according to an embodiment.

FIG. 3 shows a communication device/terminal device (UE) 42 that can be adapted or configured to operate according to one or more of the non-limiting example embodiments described. The UE 42 comprises a processor or processing unit 50 that controls the operation of the UE 42. The processing unit 50 is connected to a transceiver unit 52 (which comprises a receiver and a transmitter) with associated antenna(s) 54 which are used to transmit signals to and receive signals from a radio access node 40 in the network 32. The UE 42 also comprises a memory or memory unit 56 that is connected to the processing unit 50 and that contains instructions or computer code executable by the processing unit 50 and other information or data required for the operation of the UE 42.

Figure 4:
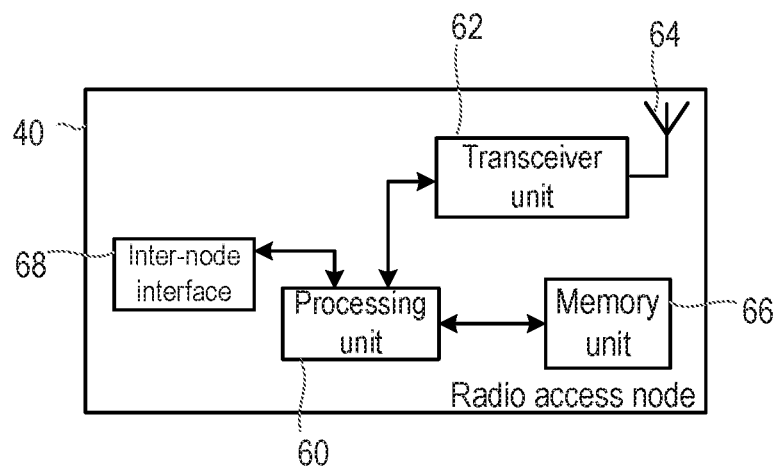
FIG. 4 is a block diagram of a radio access node according to an embodiment.

FIG. 4 shows a network node in the form of a radio access node (for example a cellular network base station such as a NodeB or an eNodeB, eNB) 40 that can be adapted or configured to operate according to the example embodiments described. The radio access node 40 comprises a processor or processing unit 60 that controls the operation of the radio access node 40. The processing unit 60 is connected to a transceiver unit 62 (which comprises a receiver and a transmitter with associated antenna(s) 64 which are used to transmit signals to, and receive signals from, UEs 42 in the network 32. The radio access node 40 also comprises a memory or memory unit 66 that is connected to the processing unit 60 and that contains instructions or computer code executable by the processing unit 60 and other information or data required for the operation of the radio access node 40. The radio access node 40 also includes components and/or circuitry 68 for allowing the radio access node 40 to exchange information with another radio access node 40 (for example via an X2 interface), and/or with a core network node 36, 38 (for example via an S1 interface). It will be appreciated that base stations for use in other types of network (e.g. UTRAN or WCDMA RAN) will include similar components to those shown in FIG. 4 and appropriate interface circuitry 68 for enabling communications with the other radio access nodes in those types of networks (e.g. other base stations, mobility management nodes and/or nodes in the core network). It will be appreciated that a radio access node 40 can be implemented as a number of distributed functions in the radio access network (RAN).

Figure 5:
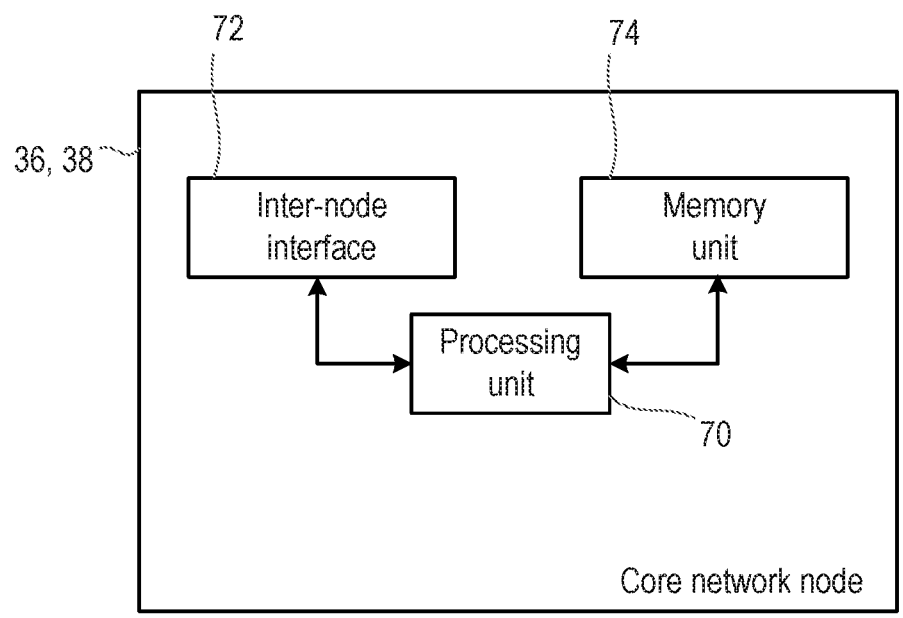
FIG. 5 is a block diagram of a core network node according to an embodiment.

FIG. 5 shows a network node in the form of a core network node 36, 38 that can be used in the example embodiments described. The node 36, 38 could be an MME 36, an SGW 38, or another type of core network node (e.g. a radio network controller, RNC). The node 36, 38 comprises a processing unit 70 that controls the operation of the node 36, 38. The processing unit 70 is connected to interface components and/or circuitry 72 for allowing the node 36, 38 to exchange information with network nodes in the radio access network (RAN), for example radio access nodes 40, which it is associated (which is typically via the S1 interface) and/or with other nodes in the core network part of the network. The node 36, 38 also comprises a memory unit 74 that is connected to the processing unit 70 and that stores program and other information and data required for the operation of the node 36, 38.

It will be appreciated that only the components of the UE 42, radio access node 40 and network node 36, 38 required to explain the embodiments presented herein are illustrated in FIGS. 3, 4 and 5.

Although the embodiments of the present disclosure will mainly be described in the context of LTE, it will be appreciated by those skilled in the art that the problems and solutions described herein are equally applicable to other types of wireless access networks and user equipments (UEs) implementing other access technologies and standards, and thus LTE (and the other LTE specific terminology used herein) should only be seen as examples of the technologies to which the techniques can be applied. In particular, the problems and techniques described herein could be implemented in so-called 5G standards that are in development.

As noted above, it is desirable to provide a mechanism to retain access-stratum (AS) keys in certain circumstances, for example whenever it is acceptable to do so from a security perspective. These mechanisms could be used to retain the AS keys after a handover from a source cell to a target cell. One possible mechanism that could be used with an X2 handover is described below with reference to FIG. 6.

Figure 6:
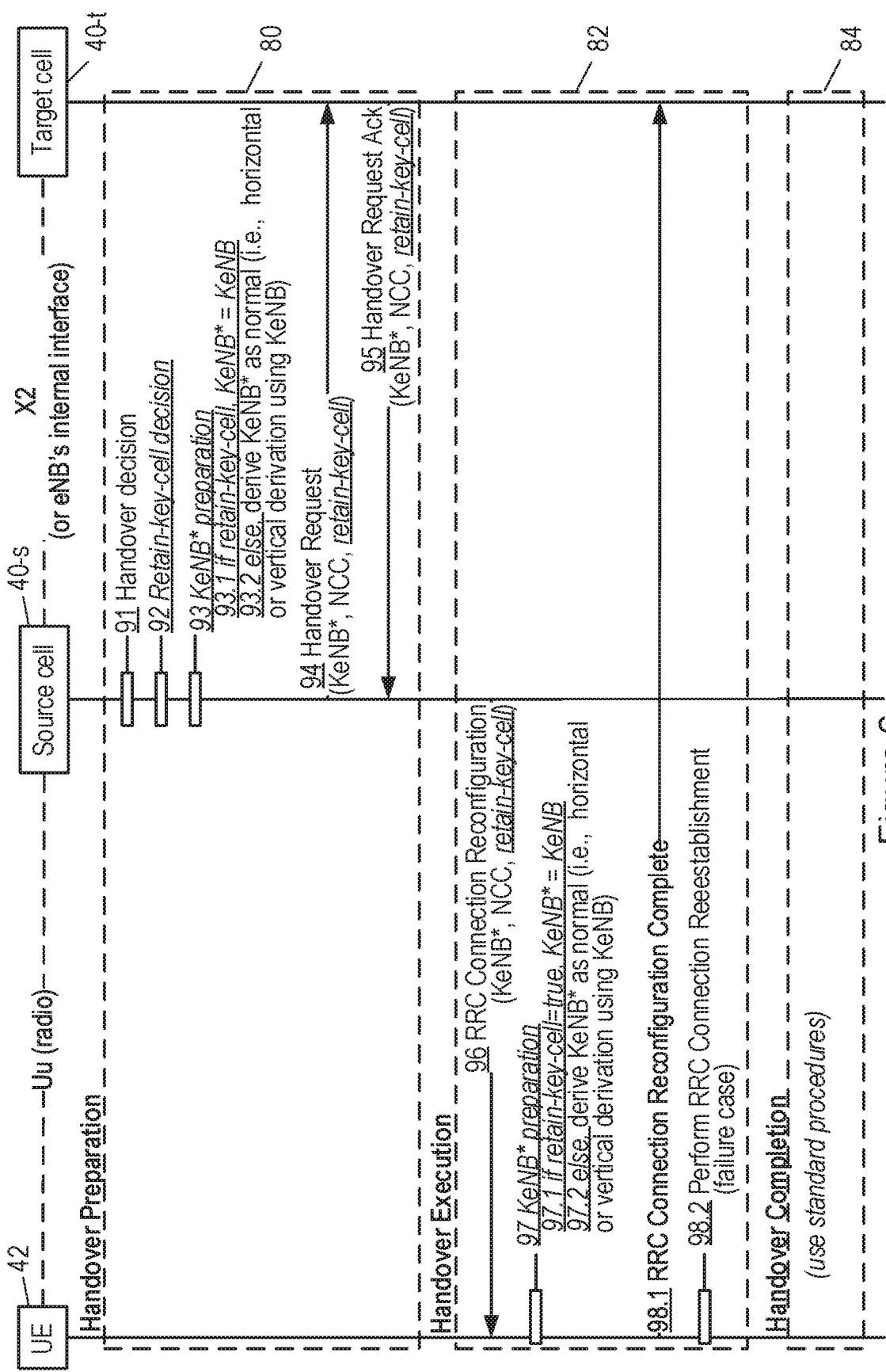
FIG. 6 illustrates the signalling in a handover between a source eNB and a target eNB in an LTE network in which a key can be reused.

FIG. 6 shows the signalling between a UE 42, a source cell 40-s and a target cell 40-t in an X2 handover. The signalling between the source cell 40-s and the target cell 40-t can be on the X2 interface, and since the source cell 40-s and the target cell 40-t may be provided by a single eNB 40, the X2 interface may be an internal interface in the eNB 40.

The signalling in FIG. 6 is separated into three groups, referred to as Handover Preparation 80, Handover Execution 82, and Handover Completion 84. In FIG. 6, several of the messages and procedures used are the same as a conventional LTE X2 handover, and so certain messages and procedures have not been shown (e.g. the messages and procedures in the Handover Completion group 84).

The messages and procedures that are underlined in FIG. 6 represent the exemplary additional messages and procedures to the conventional X2 handover that can be used to retain a key after a handover.

In the Handover Preparation stage 80, the source cell 40-s decides to perform a handover (block 91). The source cell 40-s decides whether to retain the key or not (denoted this decision is denoted 'retain-key-cell' and has a 'retain-key-cell value') at block 92. In block 93 the source cell 40-s prepares the $K_{eNB}*$ to use after the handover taking the retain-key-cell value from block 92 into account. That is, if the retain-key-cell value is true, the source cell 40-s reuses the old key, i.e., $K_{eNB}*=K_{eNB}$ (step 93.1), and if the retain-key-cell value is false (i.e. the key is not to be retained), the source cell 40-s derives a $K_{eNB}*$ as normal (i.e. through horizontal or vertical derivation using $K_{eNB}$) in step 93.2. The source cell 40-s then sends Handover Request 94, containing the retain-key-cell value, to the target cell 40-t along with the $K_{eNB}*$ and the Next Hop Chaining Count (NCC) values. The target cell 40-t sends Handover Request Ack 95, containing the retain-key-cell value in a transparent container to the source cell 40-s.

In the Handover Execution group 82, the source cell 40-s sends a RRC Connection Reconfiguration message 96 containing the retain-key-cell value to the UE 42. The UE 42 prepares the $K_{eNB}*$ taking the retain-key-cell value received in message 96 into account (block 97). Block 97 is similar to block 93 above. Thus, if the retain-key-cell value is true, the UE 42 reuses the old key, i.e., $K_{eNB}*=K_{eNB}$ (step 97.1), and if the retain-key-cell value is false (i.e. the key is not to be retained), the UE 42 derives a $K_{eNB}*$ as normal (i.e. through horizontal or vertical derivation using $K_{eNB}$) in step 97.2. The UE 42 then responds by sending a RRC Connection Reconfiguration Complete message 98.1 to the target cell 40-t using the $K_{eNB}*$ determined in block 97. Alternatively, in the event of some failure (e.g. the UE 42 not being able to comply with the reconfiguration), the UE 42 performs RRC Connection Re-establishment 98.2, which results in new AS keys.

In the Handover Completion group 84, standard handover completion messages or procedures occur.

As noted above, it is possible that a network operator could elect to retain AS keys all the time, even when a UE 42 has undergone multiple handovers, which could present security risks in the network. It is also possible that a faulty implementation/eNB could lead to AS keys being retained all the time.

Therefore, the techniques described herein provide that a UE 42 can take its own decision on whether a key should be reused, whether following a handover or in another scenario, such as in the case of dual connectivity or changes in a group of secondary cells. Thus, the decision (or related policies) to retain the UE's AS keys may not be taken by the visited/serving network alone, but also involves the UE and, in some cases, the UEs home network operator as well.

The techniques provided herein provide several advantages. In particular, the UE 42 or end user (subscriber) of the UE 42 or the operator of the home network of the UE 42 can ensure the security of the UE's communications. In some embodiments, if the UE 42 does not want to comply with the network's decision to reuse a key, or if the UE 42 has been configured with policies from its home network that indicate that it is not to comply with the network's decision to reuse a key, the UE 42 may take extra procedures/steps that may change its AS keys.

The techniques provided herein will discourage networks from retaining keys for long periods of time for the sake of efficiency, because the extra procedures/steps taken by the UE 42 will defeat the network's attempts to gain efficiency at the expense of security.

In some further embodiments, UEs 42 can report key retention information for a network, such as a visited network, back to their home network. This information could be useful in selecting preferred roaming partners and in discussions on roaming agreements, etc.

Figure 7:
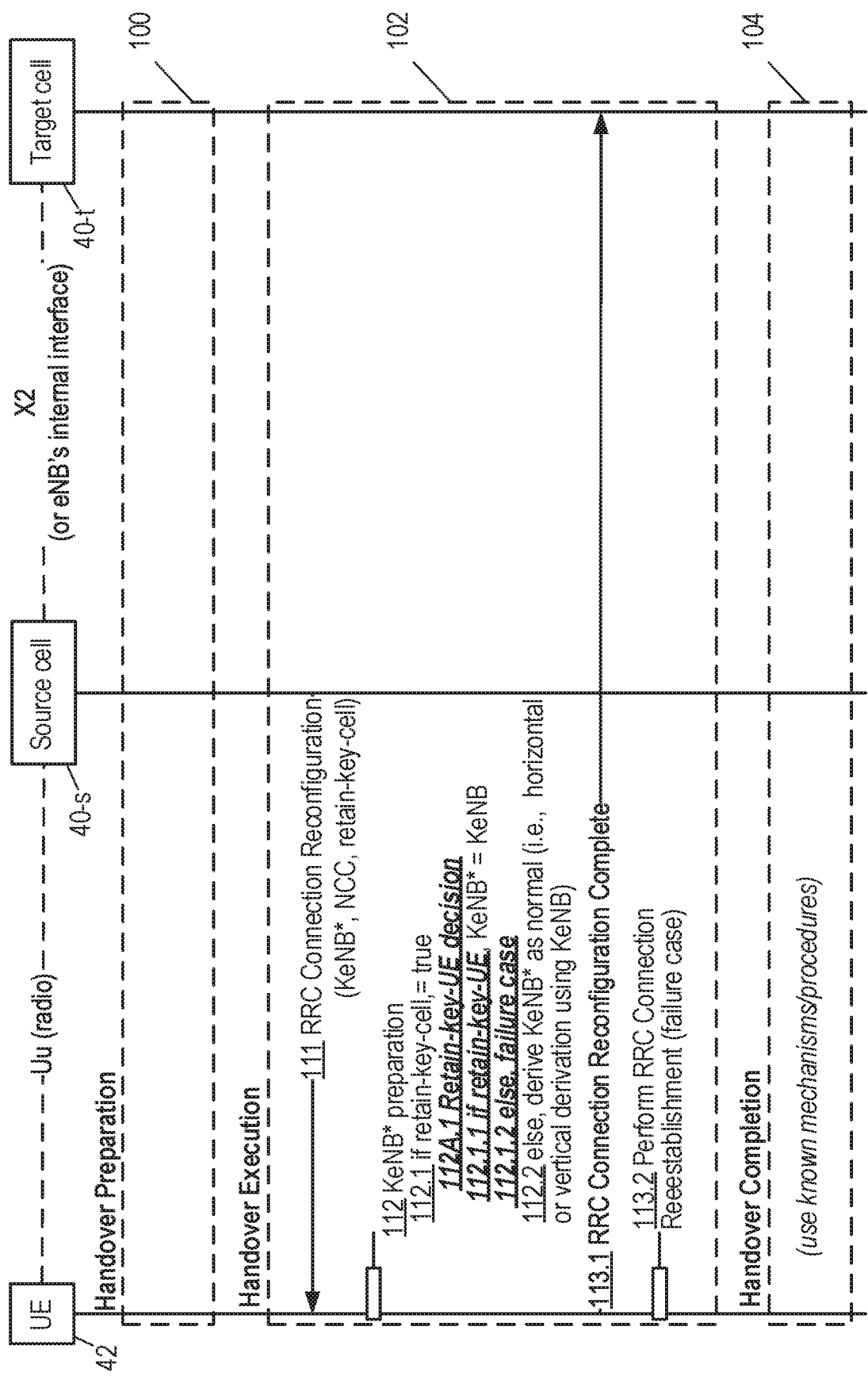
FIG. 7 is a signalling diagram illustrating the signalling in a handover between a source eNB and a target eNB in an LTE network according to an example embodiment of the techniques described herein.

One possible embodiment of the proposed techniques is described below with reference to FIG. 7. FIG. 7 shows the signalling between a UE 42, a source cell 40-*s* and a target cell 40-*t* in an X2 handover, although it will be appreciated that the techniques described herein are not limited to X2 handover, or a handover process as shown in FIG. 6, or even a handover in a 4G/LTE network. It should also be appreciated that the order of the steps, messages, fields, etc. shown in FIG. 7 could be altered, messages could be combined, fields could be put in different messages, etc. without affecting the benefits provided by the techniques described herein.

The signalling between the source cell 40-*s* and the target cell 40-*t* can be on the X2 interface, and since the source cell 40-*s* and the target cell 40-*t* may be provided by a single eNB 40, the X2 interface may be an internal interface in the eNB 40.

Thus in this procedure, there is a key (e.g. $K_{eNB}$) that is used for encrypting communications on a radio link between the source cell 40-*s* and UE 42, and it is possible for the key to be reused for encrypting communications on a radio link between the target cell 40-*t* and UE 42 after a handover or other mobility-type event (e.g. secondary cell change, dual connectivity activation, etc.).

The signalling in FIG. 7 is based on the handover procedure illustrated in FIG. 6, with additional steps/signalling according to the techniques described herein. Thus, as in FIG. 6, the signalling is separated into three groups, referred to as Handover Preparation 100, Handover Execution 102, and Handover Completion 104. In FIG. 7, several of the messages and procedures used are the same as a conventional LTE X2 handover, and so certain messages and procedures have not been shown (e.g. the messages and procedures in the Handover Completion group 104). The messages and procedures that are underlined in FIG. 7 represent the exemplary new messages and procedures over the handover procedure shown in FIG. 6.

In the Handover Preparation group 101, the signalling and procedures are the same as described above with reference to the Handover Preparation group 80. That is, the source cell 40-*s* decides to perform a handover, the source cell 40-*s* decides whether to retain the key or not (denoted this decision is denoted 'retain-key-cell' and has a 'retain-key-cell value'), and the source cell 40-*s* prepares the $K_{eNB}^*$ to use after the handover taking the retain-key-cell value into account. Thus, if the retain-key-cell value is true, the source cell 40-*s* reuses the old key, e.g., $K_{eNB}^* = K_{eNB}$, and if the retain-key-cell value is false (i.e. the key is not to be retained), the source cell 40-*s* derives a $K_{eNB}^*$ as normal (i.e. through horizontal or vertical derivation using $K_{eNB}$). The source cell 40-*s* then sends as Handover Request, containing the retain-key-cell value, to the target cell 40-*t* along with the $K_{eNB}^*$ and the Next Hop Chaining Count (NCC) values. The target cell 40-*t* sends a Handover Request Ack, containing the retain-key-cell value in a transparent container to the source cell 40-*s*.

In the Handover Execution group 102, the source cell 40-*s* sends a RRC Connection Reconfiguration message 111 containing the retain-key-cell value to the UE 42. This retain-key-cell value indicates the network's decision on whether to retain/reuse the AS keys after the handover or not.

The UE 42 prepares the $K_{eNB}^*$ taking the retain-key-cell value received in message 111 into account (block 112).

If the retain-key-cell value is true (step 112.1), then the UE 42 makes a decision on whether the old key $K_{eNB}$ is to be reused (step 112A.1). This decision is denoted 'retain-key-UE' and has a 'retain-key-UE value').

If the UE 42 determines that the old key can be reused (i.e. if 'retain-key-UE value' is true), then the UE 42 reuses the old key, i.e., $K_{eNB}^* = K_{eNB}$ (step 112.1.1).

If the UE 42 determines that the old key cannot or should not be reused (i.e. if 'retain-key-UE value' is false)—step 112.1.2—then the UE is in a failure case, and takes an action. Possible actions are described in more detail below, with one example shown in FIG. 7 as step 113.2.

If the retain-key-cell value from the network is false (i.e. the key is not to be retained/reused), the UE 42 derives a $K_{eNB}^*$ as normal (i.e. through horizontal or vertical derivation using $K_{eNB}$) in step 112.2.

After step 112, based on the result of step 112, the UE 42 can respond to the RRC Connection Reconfiguration message 111 by sending a RRC Connection Reconfiguration Complete message 113.1 to the target cell 40-*t* in the event that the handover is a success (e.g. if the retain-key-cell value is false, or if the UE 42 determines that the old key can be reused), or performing a RRC Connection Re-establishment 113.2 in the event of a handover failure (which can be due to the UE 42 determining that the old key cannot be reused), which will result in new AS keys.

In the Handover Completion group 104, standard handover completion messages or procedures occur.

Figure 8:
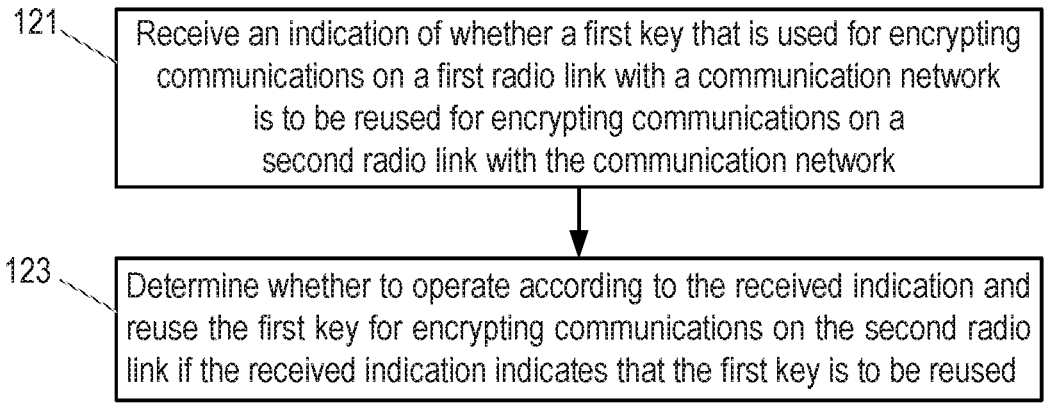
FIG. 8 is a flow chart illustrating a method of operating a communication device according to an aspect.

The flow chart in FIG. 8 illustrates a method of operating a communication device (UE) 42 in accordance with embodiments of the techniques described herein. It will be appreciated below that this method can be used by the UE 42 shown in FIG. 7, but it will also be appreciated that the method can be used in processes and procedures other than the X2 handover shown. For example, the method shown in FIG. 8 can be applied to handover procedures in future 5G networks.

The steps in the flow chart can be performed by the communication device 42, for example by the processing unit 50, optionally in conjunction with the transceiver unit 52. In some embodiments, computer program code could be provided that, when executed by the processing unit 50, the processing unit 50 and more generally the communication device 42 performs the method shown in FIG. 8 and described below.

Thus, in a first step, step 121, the communication device 42 receives an indication of whether a first key that is used for encrypting communications on a first radio link with a communication network is to be reused for encrypting communications on a second radio link with the communication network.

In some embodiments, the indication is received on or during handover of the communication device 42 from the first radio link to the second radio link.

The first key can be an Access Stratum (AS) key, which is also known as a base key or $K_{eNB}$. The first radio link and the second radio link may be to the same radio access node (i.e. the same eNB), but to different cells managed by the radio access node. Alternatively the first radio link and the second radio link can be to different eNBs.

In the example shown in FIG. 7, the first key is the $K_{eNB}$ that is used to encrypt communications on the radio link between a UE 42 and the source cell 40-*s*. In this example, the second radio link is the radio link between the UE 42 and the target cell 40-*t* after the handover. Also in the example of FIG. 7, the indication received in step 121 corresponds to the indication of the retain-key-cell value in the received RRC Connection Reconfiguration message 111.

In other situations (i.e. other than an X2 handover), the indication in step 121 could be received in a different type of message.

If the received indication indicates that the first key is to be reused, the method further comprises the communication device 42 determining whether to operate according to the received indication and reuse the first key for encrypting communications on the second radio link (step 123). That is, the communication device 42 determines whether to follow the received indication and reuse the first key.

In a first embodiment, step 123 comprises the communication device 42 evaluating a policy or configuration for the communication device 42. The policy or configuration may indicate when or whether it is acceptable to reuse a key for another radio link. In some embodiments, the home network of the communication device 42 (e.g. the network that the subscriber using the communication device 42 has a subscription with) could configure or provide the UE 42 with the policy or configuration. In other embodiments, the manufacturer of the UE 42 could configure the UE 42 with the policy or configuration.

Such a policy or configuration could be stored in the communication device 42, for example on or in a Subscriber Identity Module (SIM) or a Universal SIM (USIM), or other storage medium (e.g. memory unit 56) in the communication device 42. The policy or configuration could be provided to the UE 42 on activation of the SIM or USIM or other storage medium, pre-configured on the SIM or USIM or other storage medium, or provided over the air.

The policy or configuration may specify one or more conditions that set out when it is acceptable or not to reuse/retain a key for another radio link. In some embodiments, the policy or configuration could specify that the key should always be changed (i.e. never reused). This may be useful for some types of users, e.g. police or other users where communications should have the highest security. In some embodiments, the policy or configuration could specify that the keys should always be changed (i.e. never reused) for certain public land mobile networks (PLMNs), cells, tracking areas, and/or slices. In this case, the policy or configuration could list identifiers for these certain PLMNs, cells, tracking areas and/or slices. In some embodiments, the policy or configuration could specify that keys can only be reused in certain PLMNs, cells, tracking areas or slices. In this case, the policy or configuration could list identifiers for these certain PLMNs, cells, tracking areas and/or slices. It will be appreciated that in certain embodiments, the policy or configuration could specify any combination of the conditions set out above.

In some embodiments, which can be used when the UE 42 is roaming in a network other than the home network of the UE 42 (otherwise referred to as a 'visited network'), if the evaluation of the policy or configuration in step 123 results in the decision that the first key is not to be reused for encrypting communications, the communication device 42 can add an identifier of the visited network to a list of communication networks that do not meet the policy or configuration. This list can be maintained or stored in the communication device 42, for example on or in the SIM or USIM or other storage medium. In some cases, this list can be used to determined which network a UE 42 can roam onto in the event that it does not have coverage from its home network.

In alternative embodiments of step 123, the communication device 42 can evaluate information on whether a second key has changed to determine whether or not a first key is to be reused. In particular embodiments, step 123 can comprise determining that the first key is not to be reused for encrypting communications on the second radio link if the second key has changed.

The first key may be a key configured or derived by the radio access network (or a radio access node in the radio access network), and the second key may be a key configured or derived by the core network (or a node in the core network). Thus the second key can be a higher level key to the first key. For example, where the first key is a base key/AS key/$K_{eNB}$, the second key can be a non-AS (NAS) key. The NAS key may change after authentication/reauthentication or derivation/rederivation of the NAS key.

In other embodiments of step 123, the communication device 42 can evaluate information on an event or procedure associated with the communication device 42 to determine whether the first key is to be reused for encrypting communications on the second radio link.

The information on an event or procedure associated with the communication device 42 can comprise an indication of whether a temporary identifier for the communication device 42 assigned by the communication network has changed. One example of the temporary identifier is a Globally Unique Temporary Identifier (GUTI) in LTE, although other temporary identifiers or types of temporary identifiers may be used in a 5G network. In this case, step 123 can comprise determining that the first key is not to be reused for encrypting communications on the second radio link if the temporary identifier has changed.

The information on an event or procedure associated with the communication device 42 can also or alternatively comprise an indication of whether a radio access technology, RAT, used by the communication device 42 to communicate with the communication network has changed. For example the RAT could change from a 5G technology to a 4G technology (e.g. LTE), or vice versa. In this case, step 123 can comprise determining that the first key is not to be reused for encrypting communications on the second radio link if the RAT has changed.

The information on an event or procedure associated with the communication device 42 can also or alternatively comprise an indication of whether an identifier for the second radio link is in a list of identifiers stored by the communication device 42. For example, the identifier could be a tracking area (TA) or a 5G equivalent of the tracking area, and the UE 42 may store a Tracking Area Index (TAI) list or a 5G equivalent of the Tracking Area Index list. In this case, step 123 can comprise determining that the first key is not to be reused for encrypting communications on the second radio link if the identifier for the second radio link is not in the list of identifiers stored by the communication device 42. Put the other way around, step 123 can comprise determining that the first key is to be reused for encrypting communications on the second radio link if the identifier for the second radio link is in the list of identifiers stored by the communication device 42.

In some other embodiments, step 123 can comprise evaluating a counter value. The value of the counter can correspond to the number of times that the first key has been reused. That is, the counter value can relate to the number of different radio links the first key has been used for. In some embodiments, step 123 can comprise determining that the first key is not to be reused for encrypting communications on the second radio link if the counter value exceeds a threshold value. In this case, a key can be permitted to be reused a certain number of times (the threshold value). Suitable threshold values could be for example 8, 16, 32, 64, 128, etc. The threshold value can also be assigned to the communication device 42 by the network or be negotiated between the communication device 42 and the network.

If in step 123 the communication device 42 determines that the first key is not to be reused for encrypting communications on the second radio link (referred to as the 'failure case' in the description of FIG. 7), the communication device 42 can signal to a network node in the communication network that the communication device 42 has determined that the first key is not to be reused. This signal can be provided in several different forms, as described in more detail below.

In some preferred embodiments, if UE 42 determines that the first key is not to be reused for encrypting communications on the second radio link, the UE 42 can re-establish a connection to the communication network (that is providing, or that is to provide, the second radio link), as shown in step 113.2 of FIG. 7. In LTE networks, this can be referred to as Radio Resource Control, RRC, Connection Re-establishment. Re-establishing a connection to the network will cause encryption keys (i.e. $K_{eNB}$) to be regenerated. Thus the UE 42 signals its decision in step 123 by triggering connection re-establishment.

In some embodiments, on performing connection re-establishment, the UE 42 can indicate a reason for the connection re-establishment to the network in or with the re-establishment signalling. In this case, the UE 42 can indicate the reason for the connection re-establishment as the determination by the UE 42 that the first key is not to be reused for encrypting communications on the second radio link. This reason may be signalled as a new enumerated value in the reestablishmentCause field, which could correspond to the reason "cannotRetainKey", "retainKeysNotAllowedbyHome", "needFreshKeyAfter5Handovers", etc.

In less preferred embodiments, if UE 42 determines that the first key is not to be reused for encrypting communications on the second radio link, the UE 42 can nevertheless use the first key for encrypting communications on the second radio link and send a signal to the communication network (e.g. encrypted using the first key or a key derived from the first key) indicating that the UE 42 determined that the first key is not to be reused for encrypting communications on the second radio link. Thus, in this embodiment, the UE 42 complies with the indication received from the network in step 121, but signals its preference for the first key not to be reused to the network. The network can then decide whether or not the first key should continue to be reused for the second radio link, or whether a new key should be generated or determined. In the example of FIG. 7, this step can correspond to the sending of the RRC Connection Reconfiguration Complete message 113.1.

In other less preferred embodiments, if UE 42 determines that the first key is not to be reused for encrypting communications on the second radio link, the UE 42 can 'overwrite' the decision of the network indicated in step 121 and generate a new key, and use that key to encrypt communications between the UE 42 and the network on the second radio link. The network will not be able to decrypt the communications from the UE 42 (since the network is expecting the first key to be used for encryption). The network can therefore determine from the fact that it cannot decrypt the received encrypted message that the UE 42 has determined that the first key should not be reused. The network could then decide whether or not the first key should continue to be reused for the second radio link, or whether a new key should be generated or determined. In the former case, it is likely that communications on the second radio link between the UE 42 and the network will cease.

Thus, in an example of this embodiment, if the UE 42 determines that the first key is not to be reused for encrypting communications on the second radio link, the UE 42 can determine a second (further) key (e.g. $K_{eNB}^*$) from the first key (e.g. $K_{eNB}$), and the UE 42 can use the further key for encrypting communications on the second radio link. The message encrypted using the further key could be the RRC Connection Reconfiguration Complete message 113.1 in FIG. 7.

In another, less preferred embodiment, on determining that the first key is not to be reused for encrypting communications on the second radio link, the UE 42 could stop communicating with the network. For example the UE 42 could change to an idle mode of operation (e.g. IDLE mode) or detach from the communication network.

In another embodiment, if the UE 42 determines that the first key is not to be reused for encrypting communications on the second radio link, the UE 42 can encrypt a first signal from the UE 42 to the communication network on the second radio link using the first key. This first signal can indicate to the network that the UE 42 does not want the first key to be reused for encrypting communications on the second radio link. Next, the UE 42 can determine a second (further) key (e.g. $K_{eNB}^*$) from the first key (e.g. $K_{eNB}$), and the further key can be used for encrypting subsequent signals from the UE 42 to the communication network on the second radio link. In that case, on receipt of the first signal, the network can decide whether or not to change the key for the second radio link. If so, the network can also determine the further key and use that for encrypting communications on the second radio link.

In yet another embodiment, on receipt of an indication from the UE 42 that the UE 42 does not want to reuse the first key for the second radio link, the network may send a signal to the UE 42 indicating the UE 42 can determine whether or not the first key should be changed. In that case, the network may need to attempt to decrypt the next message received from the UE 42 both the first key and a new key if the decision of the UE 42 is not known.

If in step 123 the UE 42 determines that it is to operate according to the received indication and reuse the first key, the UE 42 can then use the first key for encrypting communications on the second radio link.

If the indication received in step 121 indicates that the first key is not to be reused for encrypting communications on the second radio link, the UE 42 can then determine a second key (e.g. $K_{eNB}^*$) from the first key (e.g. $K_{eNB}$), and the second key can be used by the UE 42 for encrypting communications on the second radio link.

In some embodiments, the method described above can additionally include the step of sending information on the received indication to a network node in a communication network. The network node may be in a home network of the communication device 42 (e.g. if the communication device 42 is roaming in a visited network, or if the communication device 42 is attached to the home network) or the network node may be a network node in a visited network. The information on the received indication can include the decision of the network (which may be a decision of a particular RAN node or CN node) on whether the first key is to be reused. The information may also indicate information that can identify the network and/or network node that made the decision. For example the information may indicate a PLMN identifier, a cell identifier, a tracking area, and/or a slice identifier, etc. The information may also or alternatively indicate information relating to key change/key reuse, such as the number of key changes (possible per handover), key change policies supported in the network, how often the GUTI changes, how often an authentication procedure is performed, etc.

The information to be sent may be stored in the UE 42, for example on a SIM or USIM or in an internal memory (e.g. memory unit 56), and sent to the network node at any desired time. For example the information can be sent the next time that the UE 42 is connected to the home network (in the case that the indication was received from a visited network). Alternatively, the UE 42 can report the information and a preconfigured time. In another alternative, the UE 42 can send the information as soon as the indication is received in step 121.

The information can be sent to the network via RRC signalling, NAS signalling or as user plane data.

The network node in the communication network (the home network or the visited network) can be a node in the core network, e.g. on the NAS level. It will be appreciated that the UE 42 can report information when the UE 42 is connected to the home network, i.e. the UE 42 does not have to be roaming in order to report this information. In that case, the information may be useful for a network operator to determine whether RAN nodes and/or CN nodes in the network are operating correctly. In the case where the UE 42 is reporting on the decision of a visited network, the reported information can be useful for the home network operator when deciding on roaming agreements or preferred roaming partners.

In some embodiments, the information on the received indication sent to the network can also include information on action taken by the UE 42 in response to the received indication. For example the information on the action taken can include any of the actions described above following the UE 42 determining that the first key should not be reused.

Figure 9:
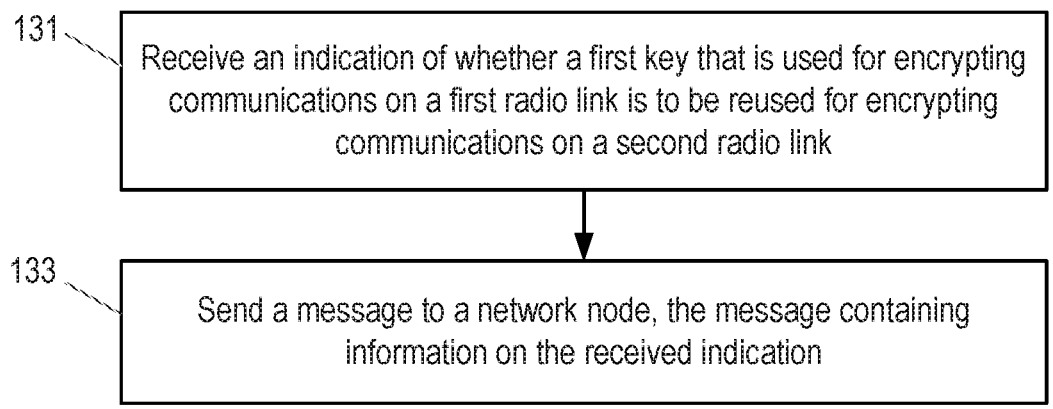
FIG. 9 is a flow chart illustrating an alternative method of operating a communication device according to an aspect.

The flow chart in FIG. 9 illustrates a method of operating a communication device 42 according to an alternative aspect of the techniques described herein. It will be appreciated below that this method can be used by the UE 42 shown in FIG. 7, but it will also be appreciated that the method can be used in processes and procedures other than the X2 handover shown. For example, the method shown in FIG. 9 can be applied to handover procedures in future 5G networks.

The steps in the flow chart can be performed by the communication device 42, for example by the processing unit 50, optionally in conjunction with the transceiver unit 52. In some embodiments, computer program code could be provided that, when executed by the processing unit 50, the processing unit 50 and more generally the communication device 42 performs the method shown in FIG. 9 and described below.

Thus, in a first step, step 131, the communication device 42 receives an indication of whether a first key that is used for encrypting communications on a first radio link with a communication network is to be reused for encrypting communications on a second radio link with the communication network. Step 131 is the same as step 121 in FIG. 8, and the various embodiments of that step also apply to step 131.

Next, in step 133, the communication device 42 sends a message to a network node in a communication network, with the message containing information on the received indication. The network node may be in a home network of the communication device 42 (e.g. if the communication device 42 is roaming in a visited network, or if the communication device 42 is attached to the home network) or the network node may be a network node in a visited network. The information on the received indication can include the decision of the network (which may be a decision of a particular RAN node or CN node) on whether the first key is to be reused. The information may also indicate information that can identify the network and/or network node that made the decision. For example the information may indicate a PLMN identifier, a cell identifier, a tracking area, and/or a slice identifier, etc. The information may also or alternatively indicate information relating to key change/key reuse, such as the number of key changes (possible per handover), key change policies supported in the network, how often the GUTI changes, how often an authentication procedure is performed, etc.

The information to be sent may be stored in the UE 42, for example on a SIM or USIM or in an internal memory (e.g. memory unit 56), and sent to the network node at any desired time. For example the information can be sent the next time that the UE 42 is connected to the home network (in the case that the indication was received from a visited network). Alternatively, the UE 42 can report the information and a preconfigured time. In another alternative, the UE 42 can send the information as soon as the indication is received in step 131.

In step 133 the information can be sent via RRC signalling, NAS signalling or as user plane data.

The network node in the communication network (the home network or the visited network) can be a node in the core network, e.g. on the NAS level. It will be appreciated that the UE 42 can report information when the UE 42 is connected to the home network, i.e. the UE 42 does not have to be roaming in order to report this information. In that case, the information may be useful for a network operator to determine whether RAN nodes and/or CN nodes in the network are operating correctly. In the case where the UE 42 is reporting on the decision of a visited network, the reported information can be useful for the home network operator when deciding on roaming agreements or preferred roaming partners.

In some embodiments, the information on the received indication sent to the network can also include information on action taken by the UE 42 in response to the received indication. For example the information on the action taken can include any of the actions described above following the UE 42 determining that the first key should not be reused.

Figure 10:
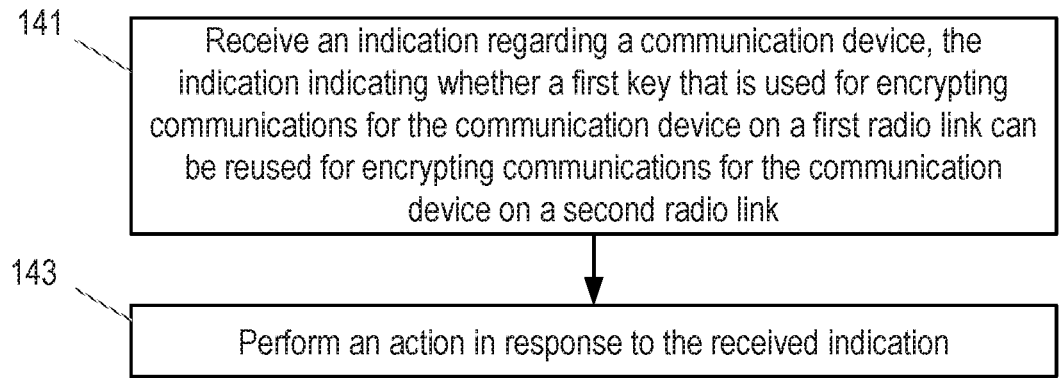
FIG. 10 is a flow chart illustrating a method of operating a network node according to an aspect.

In some embodiments of the techniques described herein, a UE 42 and network can negotiate or agree on whether a key used for encrypting communications on a first radio link should be reused for encrypting communications on a second radio link. This negotiation or agreement can take place prior to a need to change the key arising. This method, from the point of view of a network node, is shown in FIG. 10.

In some embodiments, a UE 42 could inform its preference or decision about whether a key should be reused directly to the relevant RAN node 40 (i.e. the RAN node 40 providing the radio link). The UE 42 and the RAN node 40 could also negotiate the same. This may include the UE 42 signalling or communicating a key reuse policy or configuration to the RAN node 40. The RAN node 40 may be configured with its own policy on key reuse, similarly to the UE 42 described above with reference to FIG. 8. This RAN node policy may overrule the policy received from the UE 42. In that case, the UE 42 could be informed by the RRC layer that the RAN node 40 cannot or will not fulfil or comply with the policy provided by the UE 42. The RAN node 40 may also signal to the UE 42 the policy that the RAN node 40 can provide to the UE 42. If the UE 42 is roaming in a visited network, the UE 42 can optionally then determine whether it wants to stay attached to that network, or whether it wants to try and find another network which can fulfil the UE's preference, policy or configuration.

In other embodiments, the UE 42 could inform its preference or decision about whether a key should be reused to the serving CN node (e.g. a serving MME 36) or to a visited CN node (e.g. to an MME 36 in a visited network). The UE 42 and the serving/visited CN could also negotiate the same. The serving/visited CN node could then instruct the relevant RAN node 40 about the UE's keys should be handled, i.e. whether to use the possibility of retaining (AS) keys or not. If the UE 42 cannot accept or operate according to the negotiated policy provided by the network, then the UE 42 could reject the network and try to find another network which can meet the preference, policy or configuration of the UE 42.

In other embodiments, a CN node in the home network of the UE 42 could inform a serving/visited CN node about the preference, policy or configuration of the UE 42. The serving/visited CN node could then inform the RAN node as mentioned above. If the policy or configuration in the UE 42 is set by the home network operator, then the same policy or information on the configuration could be stored in a Home Subscriber Server (HSS) or User Data Management (UDM) functions for this particular subscriber/UE 42. The policy or configuration could be retrieved from the HSS/UDM by a core network node (e.g. an MME 36 or an Access and Mobility Management Function (AMF)), for example when the UE 42 performs a registration procedure. The policy could be stored in the core network node (e.g. MME/AMF) in the context information related to that subscriber/UE 42. The core network node (e.g. MME/AMF) could provide the policy or configuration to the relevant RAN node 40, for example in the Initial Context Setup Request message from the MME/AMF to the RAN node 40. The RAN node 40 could then use the policy to determine whether to use the feature of retaining keys or not, and how frequently it should change the keys.

In the case of the UE 42 roaming, a Policy Control Function (PCF) or Policy Control and Charging (PCC) function and the MME/AMF in the visited network may have additional policy rules which are applied to its RAN. These policy rules may overrule the policy for the UE 42 retrieved from the HSS/UDM in the home network. If so, the UE 42 could be informed either by the NAS layer or the RRC layer that the visited network cannot or will not fulfil the policy for the UE 42 provided by the home network. The UE 42 could then decide whether it wants to stay attached to the visited network or try to find another network which can fulfil the policy set by its home network. In this particular case when the home network operator has configured the policy in the UE 42, the UE 42 could reject the network and try to find a different network.

Thus the flow chart in FIG. 10 illustrates a method of operating a network node according to an aspect of the techniques described herein. The network node can be RAN node, such as an eNB 40, or it can be a CN node, such as an MME 36 or SGW 38, or any equivalent node in a 5G network. References to network node below should therefore be understood as referring to a RAN node or a CN node.

In some embodiments the steps in the flow chart can be performed by the RAN node 40, for example by the processing unit 60, optionally in conjunction with the transceiver unit 64. In some embodiments, computer program code could be provided that, when executed by the processing unit 60, the processing unit 60 and more generally the RAN node 40 performs the method shown in FIG. 10 and described below. In other embodiments the steps in the flow chart can alternatively be performed by the CN node 36, 38, for example by the processing unit 70, optionally in conjunction with the inter-node interface 72. In some embodiments, computer program code could be provided that, when executed by the processing unit 70, the processing unit 70 and more generally the CN node 36, 38 performs the method shown in FIG. 10 and described below.

Thus, in step 141, the network node receives an indication regarding a UE 42, the indication indicating whether a first key that is used for encrypting communications for the UE 42 on a first radio link can be reused for encrypting communications for the UE 42 on a second radio link.

The indication can be received from another network node, e.g. from a core network node 36, 38 in the network, or in the home network of the UE 42, and in other embodiments the indication can be received from the UE 42.

The network node then performs an action in response to the received indication (step 143).

The action in step 143 can comprise comparing the received indication to a policy or configuration for the network node or communication network. The policy or configuration can indicate whether a first key that is used for encrypting communications for a UE 42 on a first radio link can be reused for encrypting communications for a UE 42 on a second radio link. The action in step 143 may further comprise sending a signal to the UE 42 based on the result of the comparison, the signal indicating to the UE 42 whether a first key that is used for encrypting communications for the UE 42 on a first radio link can be reused for encrypting communications for the UE 42 on a second radio link.

Alternatively, where the action in step 143 comprises comparing the received indication to a policy or configuration for the network node or communication network, the indication regarding the UE 42 in step 141 may have been received from the UE 42 itself, and thus the action in step 143 comprises sending a signal to the UE 42 based on the result of the comparison, the signal indicating whether the network node will comply with the indication received from the UE 42.

In another alternative where the action comprises comparing the received indication to a policy or configuration for the network node or communication network, the action in step 143 can further comprise sending a signal to a radio access node 40 (e.g. an eNB) based on the result of the comparison, the signal indicating whether a first key that is used for encrypting communications for the UE 42 on a first radio link can be reused for encrypting communications for the UE 42 on a second radio link. It will be appreciated that in this embodiment the method in FIG. 10 is performed by a core network node 36, 38.

In alternative embodiments, the indication regarding the UE 42 can be a policy or configuration for the UE 42 that is received from another network node, such as a node in the core network, or a node in the home network of the UE 42, and the action in step 143 further comprises determining whether a first key that is used for encrypting communications on a first radio link is to be reused for encrypting communications on a second radio link based on the received policy or configuration for the UE 42. Then, the method comprises sending a signal to the UE 42 that indicates whether the first key is to be reused for encrypting communications on a second radio link.

In some embodiments, the indication regarding the UE 42 received in step 141 is received during a connection re-establishment procedure between the UE 42 and the network node. In some embodiments, the indication regarding the UE 42 is signalled as a cause for the re-establishment procedure.

In embodiments where the indication is received from the UE 42, the indication can comprise a signal from the UE 42 that is encrypted, and the action in step 143 can comprise determining that the UE 42 does not want the first key that was used for encrypting communications for the UE 42 on a first radio link to be reused for encrypting communications on a second radio link if the network node is not able to decrypt the received encrypted signal using the first key. In this embodiment the UE 42 will have determined that the first key should not be reused, and will have encrypted the signal to the network node using a second (further) key.

In some embodiments, the indication received in step 141 comprises a first signal from the UE 42 that is encrypted using the first key, with the first signal indicating that the first key is not to be reused for encrypting communications on the second radio link, and the action in step 143 comprises determining a second (further) key from the first key, and using the further key for decrypting subsequent signals received from the UE 42 on the second radio link.

Figure 11:
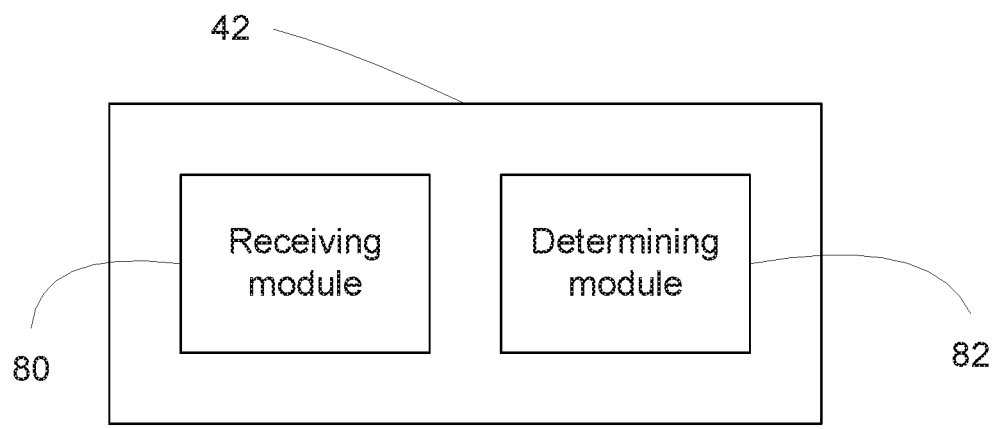
FIG. 11 is a block diagram of a communication device according to another aspect.

As an alternative to the implementations of the communication device and network node shown in FIGS. 3 and 4, each of the communication device 42 and network node 40 can be implemented or embodied in one or more processing modules. FIG. 11 is a block diagram of a communication device 42 according to an aspect, for which the functions are implemented by one or more processing modules. In particular, the communication device 42 comprises a receiving module 80 and a determining module 82. The receiving module 80 is for receiving an indication of whether a first key that is used for encrypting communications on a first radio link with a communication network is to be reused for encrypting communications on a second radio link with the communication network. The determining module 82 is for determining whether or not to operate according to the received indication and reuse the first key for encrypting communications on the second radio link if the received indication indicates that the first key is to be reused. In some embodiments, the modules are implemented purely in hardware. In other embodiments, the modules are implemented purely in software. In further embodiments, the modules are implemented in a combination of hardware and software. It will be appreciated that the receiving module 80 and/or the determining module 82 can be for performing additional functions as described above with reference to (at least) FIG. 8. In addition (or alternatively), it will be appreciated that the communication device 42 can include or comprise one or more additional processing modules for performing additional functions as described above with reference to (at least) FIG. 8.

Figure 12:
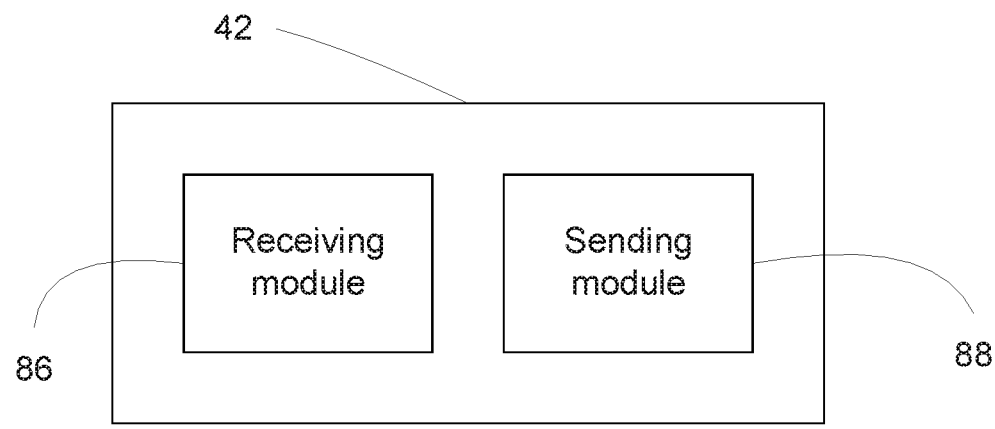
FIG. 12 is a block diagram of a communication device according to yet another aspect.

FIG. 12 is a block diagram of a communication device 42 according to another aspect, for which the functions are implemented by one or more processing modules. In particular, the communication device 42 comprises a receiving module 86 and a sending module 88. The receiving module 86 is for receiving an indication of whether a first key that is used for encrypting communications on a first radio link is to be reused for encrypting communications on a second radio link. The sending module 88 is for sending a message to a network node, the message containing information on the received indication. In some embodiments, the modules are implemented purely in hardware. In other embodiments, the modules are implemented purely in software. In further embodiments, the modules are implemented in a combination of hardware and software. It will be appreciated that the receiving module 86 and/or the sending module 88 can be for performing additional functions as described above with reference to (at least) FIG. 9. In addition (or alternatively), it will be appreciated that the communication device 42 can include or comprise one or more additional processing modules for performing additional functions as described above with reference to (at least) FIG. 9.

Figure 13:
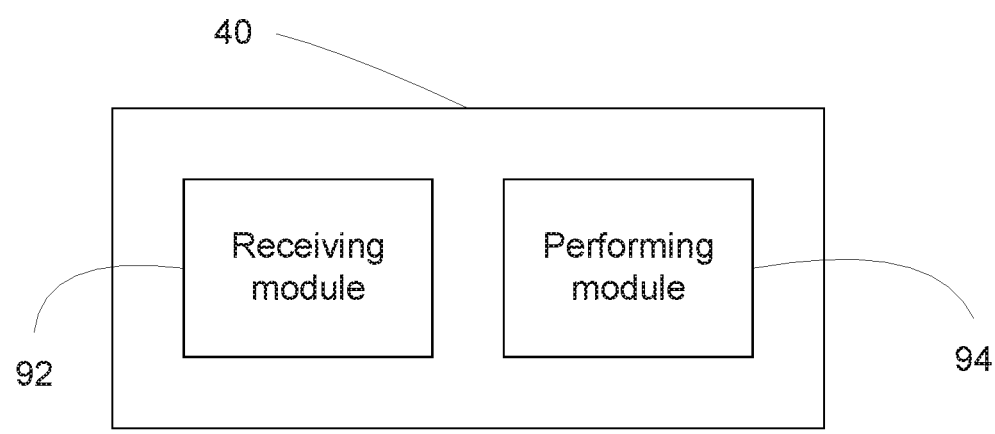
FIG. 13 is a block diagram of a network node according to another aspect.

FIG. 13 is a block diagram of a network node 40 according to another aspect, for which the functions are implemented by one or more processing modules. In particular, the network node 40 comprises a receiving module 92 and a performing module 94. The receiving module 92 is for receiving an indication regarding a communication device, the indication indicating whether a first key that is used for encrypting communications for the communication device on a first radio link can be reused for encrypting communications for the communication device on a second radio link. The performing module 94 is for performing an action in response to the received indication. In some embodiments, the modules are implemented purely in hardware. In other embodiments, the modules are implemented purely in software. In further embodiments, the modules are implemented in a combination of hardware and software. It will be appreciated that the receiving module 92 and/or the performing module 94 can be for performing additional functions as described above with reference to (at least) FIG. 10. In addition (or alternatively), it will be appreciated that the network node 40 can include or comprise one or more additional processing modules for performing additional functions as described above with reference to (at least) FIG. 10.

Therefore, there are provided improved techniques for handling the reuse of keys for different radio links in a communication network.

Modifications and other variants of the described embodiment(s) will come to mind to one skilled in the art having the benefit of the teachings presented in the foregoing descriptions and the associated drawings. Therefore, it is to be understood that the embodiment(s) is/are not to be limited to the specific examples disclosed and that modifications and other variants are intended to be included within the scope of this disclosure. Although specific terms may be employed herein, they are used in a generic and descriptive sense only and not for purposes of limitation.

The invention claimed is:

1. A method of operating a communication device, the method comprising:
   the communication device using a first key for encrypting communications on a first radio link between the communication device and a serving cell;
   the communication device receiving, from the serving cell, a Radio Resource Control (RRC) Connection Reconfiguration message comprising key-reuse information indicating that the serving cell has decided that the communication device does not need to derive a new key based on the first key but rather may use the first key to encrypt communications on a second radio link between the communication device and a target cell; and in response to receiving the RRC Connection Reconfiguration message comprising the key-reuse information, the communication device determining whether using the first key to encrypt communications on the second radio link is acceptable or not, wherein if the communication device determines that it is not acceptable to use the first key to encrypt the communications on the second radio link, the communication device performs an RRC Connection Re-establishment, otherwise the communication device sends to the target cell an RRC Connection Reconfiguration Complete message.

2. The method of claim 1, wherein the step of determining comprises performing one or more of the following steps:
evaluating a policy for the communication device;
evaluating a configuration for the communication device;
evaluating information on whether a second key has changed;
evaluating information on an event or procedure associated with the communication device;
evaluating a counter value, wherein the counter value corresponds to the number of times that the first key has been reused.

3. The method of claim 2, wherein the policy and/or the configuration indicates when and/or whether the first key can be used for another radio link.

4. The method of claim 3, wherein the policy and/or the configuration indicates that (i) the first key should never be reused for another radio link, (ii) the first key should not be used for particular Public Land Mobile Networks (PLMNs), cells, tracking areas, or slices, or (iii) the first key can be used for particular PLMNs, cells, tracking areas, or slices.

5. The method of claim 3, wherein the policy and/or the configuration is stored in a storage medium included in the communication device.

6. The method of claim 2, wherein the second key is a key configured by a network node in a core network.

7. The method of claim 2, wherein the event or the procedure associated with the communication device comprises an indication of whether a temporary identifier for the communication device has changed.

8. The method of claim 1, wherein the step of determining comprises evaluating a counter value, wherein the counter value corresponds to the number of times that the first key has been reused.

9. The method of claim 1, wherein performing the RRC Connection Re-establishment comprises the communication device sending a RRC Connection Re-establishment request.

10. The method of claim 1, wherein in the event that the step of determining determines that the first key is not to be reused for encrypting communications on the second radio link, the method further comprises:
encrypting a first signal from the communication device to the communication network on the second radio link using the first key, the first signal indicating that the first key is not to be reused for encrypting communications on the second radio link;
determining a further key from the first key; and
using the further key for encrypting subsequent signals from the communication device to the communication network on the second radio link.

11. The method of claim 1, wherein the step of receiving the indication occurs on or during handover of the communication device from the first radio link to the second radio link.

12. A communication device, the communication device comprises:
a processor; and
a memory, said memory containing instructions executable by said processor whereby said communication device is operative to:
use a first key for encrypting communications on a first radio link between the communication device and a serving cell;
employ a receiver to receive, from the serving cell, a Radio Resource Control (RRC) Connection Reconfiguration message that comprises key-reuse information indicating that the serving cell has decided that the communication device does not need to derive a new key based on the first key but rather may use the first key to encrypt communications on a second radio link between the communication device and a target cell; and
in response to receiving the RRC Connection Reconfiguration message comprising the key-reuse information, determine whether using the first key to encrypt communications on a second radio link is acceptable or not, wherein the communication device is configured such that:
if the communication device determines that it is not acceptable to use the first key to encrypt the communications on the second radio link, the communication device performs an RRC Connection Re-establishment, otherwise the communication device sends to the target cell an RRC Connection Reconfiguration Complete message.

13. The communication device of claim 12, wherein the communication device is the step of determining comprises evaluating a counter value, wherein the counter value corresponds to the number of times that the first key has been reused.

14. The communication device of claim 12, wherein performing the RRC Connection Re-establishment comprises the communication device sending a RRC Connection Re-establishment request.

15. The communication device of claim 12, wherein the communication device is further operative to:
encrypt a first signal from the communication device to the communication network on the second radio link using the first key, the first signal indicating that the first key is not to be reused for encrypting communications on the second radio link in the event that the communication device determines that the first key is not to be reused for encrypting communications on the second radio link;
determine a further key from the first key;
use the further key for encrypting subsequent signals from the communication device to the communication network on the second radio link.

16. The communication device of claim 12, wherein the communication device is further operative to:
determine a second key from the first key in the event that the received indication indicates that the first key is not to be reused for encrypting communications on the second radio link; and
use the second key for encrypting communications on the second radio link.

17. A communication device, the communication device comprises a processor and a memory, said memory containing instructions executable by said processor whereby said communication device is operative to:
- use a first key for encrypting communications on a first radio link between the communication device and a serving cell of a visited network;
- employ a receiver to receive, from the serving cell, a Radio Resource Control (RRC) Connection Reconfiguration message comprising key-reuse information indicating that the serving cell has decided that the communication device does not need to derive a new key based on the first key but rather may use the first key to encrypt communications on a second radio link between the communication device and a target cell; and
- send a message to a network node in a home network of the communication device, the message containing information indicating that the serving cell of the visited network has decided that the communication device may use the first key to encrypt communications on a second radio link between the communication device and a target cell.

18. The communication device of claim 17, wherein the message further contains information identifying the visited network.

19. The communication device of claim 17, wherein
said communication device is further operative to determine whether using the first key to encrypt communications on the second radio link is acceptable or not by evaluating a policy and/or a configuration for the communication device, and
the policy and/or the configuration indicates when and/or whether the first key can be used for another radio link.

20. The communication device of claim 19, further comprising a storage medium storing the policy and/or the configuration.

* * * * *

UNITED STATES PATENT AND TRADEMARK OFFICE
CERTIFICATE OF CORRECTION

PATENT NO. : 10,820,193 B2
APPLICATION NO. : 16/380683
DATED : October 27, 2020
INVENTOR(S) : Nakarmi et al.

Page 1 of 1

It is certified that error appears in the above-identified patent and that said Letters Patent is hereby corrected as shown below:

In the Specification

Column 2, Line 25, delete "This is information element" and insert -- This information element --, therefor.

Column 3, Line 41, delete "able collect" and insert -- able to collect --, therefor.

Column 7, Line 25, delete "(ASIC)" and insert -- (ASIC(s)) --, therefor.

Column 10, Lines 12-13, delete "(denoted this decision is denoted" and insert -- (this decision is denoted --, therefor.

Column 11, Line 52, delete "Handover Preparation group 101," and insert -- Handover Preparation group 100, --, therefor.

Column 11, Lines 56-57, delete "(denoted this decision is denoted" and insert -- (this decision is denoted --, therefor.

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*